(12) United States Patent
Yates et al.

(10) Patent No.: US 11,911,754 B1
(45) Date of Patent: Feb. 27, 2024

(54) 3D-PRINTED CATALYST BED

(71) Applicant: VENUS AEROSPACE CORP, Houston, TX (US)

(72) Inventors: Aubrey Michael Yates, Pearland, TX (US); Nicholas D. Cardwell, Houston, TX (US)

(73) Assignee: VENUS AEROSPACE CORP, Houston, TX (US)

( * ) Notice: Subject to any disclaimer, the term of this patent is extended or adjusted under 35 U.S.C. 154(b) by 0 days.

(21) Appl. No.: 18/152,678

(22) Filed: Jan. 10, 2023

(51) Int. Cl.
| | |
|---|---|
| *B01J 37/02* | (2006.01) |
| *F02K 9/68* | (2006.01) |
| *B01J 23/656* | (2006.01) |
| *B01J 23/755* | (2006.01) |
| *B01J 23/745* | (2006.01) |
| *F02K 9/42* | (2006.01) |
| *B01J 37/00* | (2006.01) |
| *B01J 37/34* | (2006.01) |
| *B01J 35/04* | (2006.01) |

(52) U.S. Cl.
CPC ....... *B01J 37/0225* (2013.01); *B01J 23/6562* (2013.01); *B01J 23/745* (2013.01); *B01J 23/755* (2013.01); *B01J 35/04* (2013.01); *B01J 37/0009* (2013.01); *B01J 37/348* (2013.01); *F02K 9/425* (2013.01); *F02K 9/68* (2013.01)

(58) Field of Classification Search
CPC ......................................................... F02K 9/68
See application file for complete search history.

(56) References Cited

U.S. PATENT DOCUMENTS

| | | | | |
|---|---|---|---|---|
| 5,711,146 | A * | 1/1998 | Armstrong | C01B 13/0214 60/218 |
| 6,652,248 | B2 * | 11/2003 | Watkins | F02K 9/68 417/381 |
| 7,145,052 | B1 * | 12/2006 | Watkins | A61L 2/208 588/299 |
| 8,858,224 | B2 * | 10/2014 | Mungas | F23D 14/82 60/39.1 |
| 2017/0246610 | A1 * | 8/2017 | Van Vliet | F02K 9/95 |
| 2020/0240365 | A1 * | 7/2020 | Elzein | F02K 9/82 |
| 2021/0148307 | A1 | 5/2021 | Elzein et al. | F02K 9/52 |

OTHER PUBLICATIONS

Rhodes, Brandie, Dynamics of a Small-Scale Hydrogen Peroxide Vapor Propulsion System, May 2019, Journal of Propulsion and Power, vol. 35, No. 3, pp. 595-600 (Year: 2019).*

(Continued)

*Primary Examiner* — Todd E Manahan
(74) *Attorney, Agent, or Firm* — HAYES SOLOWAY P.C.

(57) ABSTRACT

Disclosed is a method for forming a catalyst bed for catalytic decomposition of hydrogen peroxide, which uses 3-D printing techniques to form a porous metal backbone and treating the surface of the metal backbone to activate the surface, wherein the metal backbone is formed of a noble metal or a manganese complex. Also disclosed is a rocket engine having a 3D printed catalyst for catalytic decomposition of hydrogen peroxide, a fuel store, an oxidizer store, and a rocket engine, wherein the oxidizer is a stabilized solution of hydrogen peroxide, and a 3D printed catalyst bed.

19 Claims, 3 Drawing Sheets

(56) References Cited

OTHER PUBLICATIONS

AMFG, Expert Interview: VELO3D's VP of Technology Partnerships on Expanding the Capabilities of Metal 3D Printing, dated May 29, 2019, https:amfg.ai/2019/05/29.expert-interview-zachary-murphree-velo3d/, 10 pgs.

Cervone, et al., Development of Hydrogen Peroxide Monopropellant Rockets, American Institute o Aeronautics and Astronautics, 11 pgs.

The European Space Agency, Green Hydrogen Peroxide (H2O2) monopropellant with advance catalytic beds, https://www.esa.int/About_Us/Business_with_ESA/Small_and_Medium_Sized_Enterprises/SME_Achievements/Green_Hydrogen_Peroxide_H2O2_monopropellant_with_advanced_catalytic_beds, accessed Mar. 2, 2023.

Hofheinz, Elizabeth, Which 3D Printed Structure is Most Cell Friendly?, Mar. 2, 2022, https://rvortho.com/breaking/which-3d-printed-structure-is-most-cell-friendly/, 4 pgs.

Kopacz, et al., Hydrogen peroxide—A promising oxidizer for rocket propulsion and its application in solid rocket propellants, Fire Phu Chem, vol. 2, Issue 1, Mar. 2022, pp. 56-66.

LAJP, Rocket Engine Using Hydrogen Peroxide, http://www.lajp.org.ua/r-d-projects/rocket-engine-using-hydrogen-peroxide, accessed Mar. 2, 2023.

Morlan, et al., Catalyst Development for Hydrogen Peroxide Rocket Engines, AIAA Paper 99-2740, Nasa Technical Reports Server, 1 pg, https://ntrs.nasa.gov/citations/19990066648, accessed Mar. 3, 2023.

Pędziwiatr, et al. Decomposition of Hydrogen Peroxide—Kinetics and Review of Chosen Catalysts, Acta Innovations, 2018, No. 26:45-52.

* cited by examiner

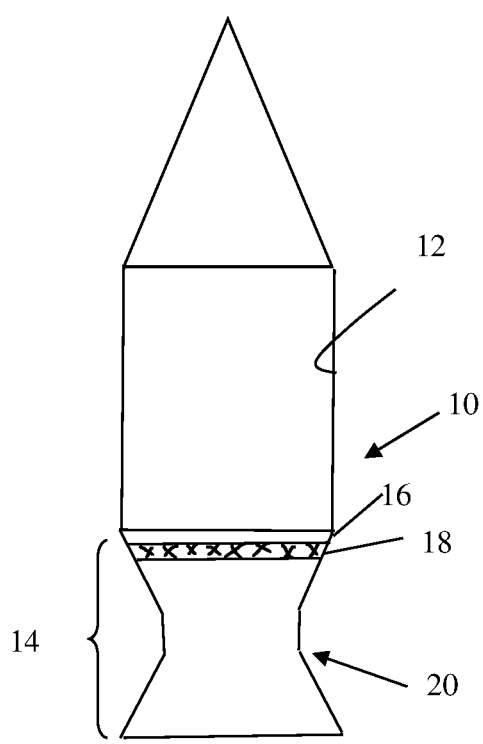
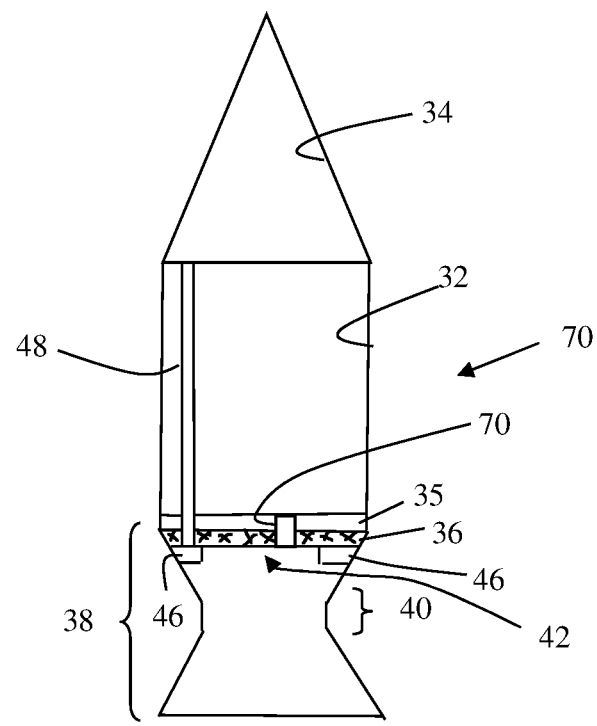
FIG. 1  FIG. 2
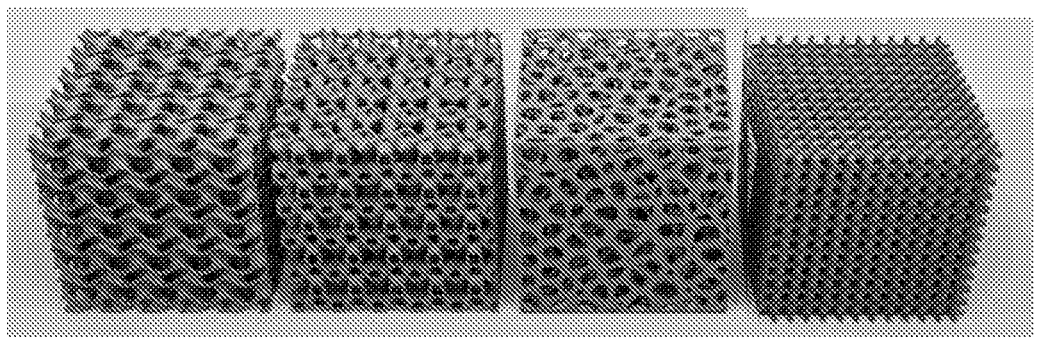
FIG. 4A  FIG. 4B  FIG. 4C  FIG. 4D

3D-PRINTED CATALYST BED

FIELD OF THE DISCLOSURE

The present disclosure relates to 3D-printed catalyst beds. The disclosure has particular utility in the case of catalyst beds used in rocket engines and will be described in connection with such utility, although other utilities are contemplated.

BACKGROUND AND SUMMARY

This section provides background information related to the present disclosure which is not necessarily prior art. This section provides a general summary of the disclosure and is not comprehensive disclosure of its full scope or all its features.

Concentrated hydrogen peroxide has been used both as a monopropellant in rocket engines, and as an oxidizer in propellant-fueled rocket engines.

In monopropellant rocket engines using hydrogen peroxide concentrated hydrogen peroxide, typically 85% in volume or higher, is heated and passed through a catalyst bed under pressure. The catalyst bed typically employs silver-plated nickel screens or pure silver screens. High decomposition efficiency (e.g., greater than 90%) of 85% hydrogen peroxide can be achieved. Catalytic decomposition of hydrogen peroxide releases 2.877 MJ of energy per 1 kg of hydrogen peroxide in terms of superheated stream and oxygen, and produces green products according to the following reaction:

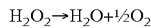

$$H_2O_2 \rightarrow H_2O + \tfrac{1}{2}O_2$$

After the rocket engine is started, decomposition is self-sustaining. The products of decomposition expand out of the rocket resulting in a propelling force capable of driving an aircraft or rocket at supersonic or hypersonic speed. Hydrogen peroxide has an advantage in being an inherently green chemical.

Concentrated liquid hydrogen peroxide, typically 70% by volume hydrogen peroxide or higher also finds use as an oxidant in solid and in liquid fueled rockets. Concentrated liquid hydrogen peroxide is second only to liquid oxygen in terms of oxygen content, and has advantages over liquid oxygen in terms of handling and storage. Mass-wise, 47% of the decomposition reaction products of hydrogen peroxide is oxygen, which makes its high oxygen concentration efficient for use as an oxidizer in a rocket.

In either case, i.e., when hydrogen peroxide is used as a monopropellant, or as an oxidizer for use in a propellant-fueled rocket engine, a catalyst is required to decompose the hydrogen peroxide.

Catalyst beds comprising metal mesh or screens coated with a noble metal such as ruthenium, rhodium, palladium, silver, osmium, iridium, platinum or gold, a mixture thereof and an alloy thereof have been developed for decomposition for hydrogen peroxide. Particularly preferred in terms of high decomposition efficiency and high melting point are silver and platinum.

Current production of solid catalyst beds for decomposition of hydrogen peroxide for rocket engines uses silver wire mesh or silver wire screens cut into circular sections, treated with acid or other treatments which will be familiar to those skilled in the art and then pressed together under force to create a semi obstructed flow path which maximizes surface area contact of the hydrogen peroxide working fluid as it passes thru the catalyst bed. The overall production process involves the following steps:

- Individual oversized layers of silver screen or mesh, typically 0.030 inches thick, are punched out of silver screen or silver mesh stock;
- each layer is individually treated, with acid or other treatments which will be familiar to those skilled in the art;
- the treated layers are trimmed to size, and are precisely positioned and assembled into a stack, typically several inches tall; and
- the trimmed layers are pressed into an open-ended holding container or cap.

These production steps are labor intensive and do not scale well for mass production. Also, the silver screen or silver mesh trimmings need to be collected and recycled to reduce material costs.

To overcome the aforesaid and other disadvantages of the prior art, in accordance with the present disclosure, we employ additive 3D printing manufacturing techniques, for example, direct metal laser sintering, to print an expanded mesh catalyst bed. The overall process is as follows:

- using direct metal laser sintering, we print an expanded mesh backbone as an over-sized stack;
- the stack is treated in a surface preparation bath using, for example, potassium cyanide; and
- the treated stack is then pressed fitted into an open-ended container or can.

The backbone metal may comprise a pure noble metal such as silver or platinum, a manganese complex, or a substrate metal such as stainless steel or nickel, which is then coated with a noble metal such as silver or platinum using one or more of electroplating, electroless plating, and thermal spraying.

More particularly, in one aspect we provide a method for forming a catalyst bed for catalytic decomposition of hydrogen peroxide, comprising the steps of: (1) forming a metal backbone using 3D printing techniques; and (2) treating the surface of the metal backbone from step (1) to activate the metal surface, wherein the metal surface comprises a noble metal.

In one embodiment the noble metal is selected from the group consisting of ruthenium, rhodium, palladium, silver, osmium, iridium, platinum and gold, a mixture thereof, and an alloy thereof.

In another embodiment the noble metal comprises pure silver or platinum.

In another embodiment the metal backbone is formed of a substrate metal coated with a noble metal.

In yet another embodiment the substrate metal comprises nickel or stainless steel, or a manganese complex and the noble metal selected from the group consisting of ruthenium, rhodium, palladium, silver, osmium, iridium, platinum and gold, a mixture thereof, and an alloy thereof, is coated on the substrate metal by one or more of electroplating, electroless plating, and thermal spraying.

The disclosure also provides a catalyst bed for catalytic decomposition of hydrogen peroxide formed by the above disclosed method.

In one embodiment of the catalyst bed the metal backbone comprises silver or platinum metal or layers of silver and platinum metal.

In another embodiment of the catalyst bed the metal backbone comprises a substrate metal plated with silver or platinum.

In yet another embodiment, the substrate metal comprises nickel or stainless steel, and the silver or platinum is electrolytic or electroless plated on the substrate metal.

The present disclosure also provides a rocket comprising a fuel store, an oxidizer store, and a rocket engine, wherein the oxidizer comprises a stabilized solution of hydrogen peroxide, and a 3D printed catalyst bed.

In one embodiment the rocket engine comprises a monopropellant rocket engine and the fuel store and the oxidizer store are one and the same.

In another embodiment the rocket comprises a propellant-fueled rocket.

In yet another embodiment of the rocket, the metal backbone comprises silver or platinum metal or layers of silver and platinum metal.

In still yet another embodiment of the rocket, the metal backbone comprises a substrate metal plated with silver or platinum.

In still yet another embodiment of the rocket, the substrate metal comprises nickel or stainless steel, and the silver or platinum is coated on the substrate metal by one or more electroplating, electroless plating, and thermal spraying.

An advantage of employing 3D printing is that virtually any desirable mesh geometry may be formed having various flow patterns, surface areas and surface roughness, as well as non-standard shapes.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the instant disclosure will be seen from the following detailed description taken in conjunction with the accompanying drawings. The drawings described herein are for illustrative purposes only of selected embodiments and not all possible implementations and are not intended to limit the scope of the present disclosure.

FIG. 1 is a schematic view of a monopropellant rocket engine in accordance with a first embodiment of the instant disclosure;

FIG. 2 is a schematic view of a propellant-fueled rocket engine in accordance with a second embodiment of the present disclosure;

FIGS. 4A-4D are perspective views of catalyst beds having various geometries in accordance with the present disclosure.

DETAILED DESCRIPTION

Figure 3:
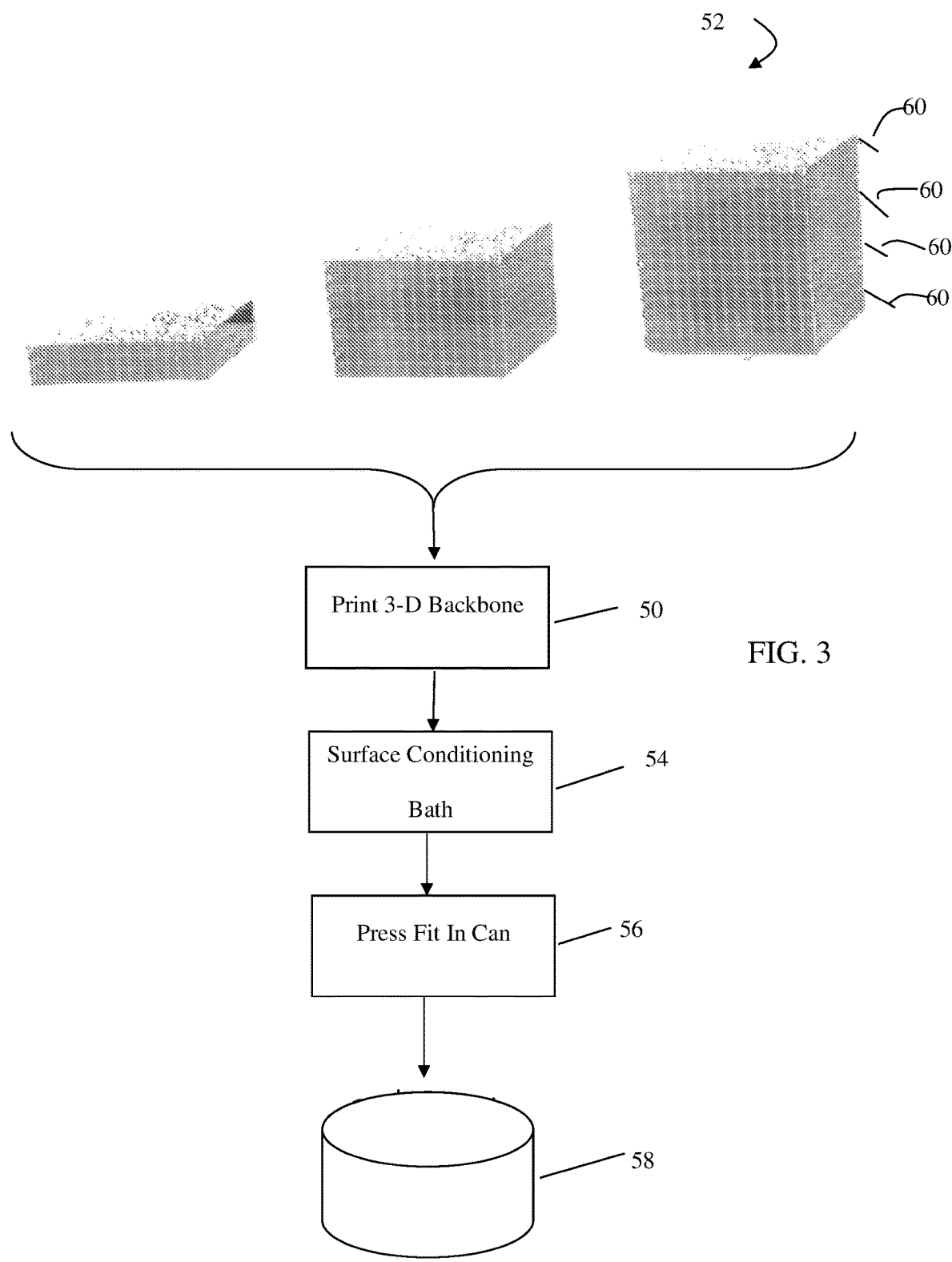
FIGS. 3 and 3A are schematic views of manufacturing processes for forming a catalyst bed in accordance with the present disclosure.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein the term "concentrated hydrogen peroxide" means hydrogen peroxide having a concentration, by volume, of about 70% or more, typically about 70 to 98% hydrogen peroxide.

FIG. 1 is a cross sectional view of a monopropellant rocket engine employing hydrogen peroxide as a monopropellant in accordance with the present disclosure. Rocket engine 10 comprises a storage tank 12 formed of a material such as stainless steel which is resistant to hydrogen peroxide for storing concentrated hydrogen peroxide. Rocket engine 10 contains concentrated, e.g., 85% by weight hydrogen peroxide as a monopropellant, and includes in addition to storage tank 12 a convergent-divergent nozzle 14, a manifold 16 connecting the storage tank 12 with a catalyst bed 18 through which the concentrated hydrogen peroxide is passed under pressure. The catalyst bed 18 comprises a silver or platinum mesh formed by a 3D additive manufacturing process and treated with a suitable surface activation treatment as will be described in detail below. The rocket engine 10 also includes an annulus region 20 in which catalytic decomposition of the hydrogen peroxide occurs. Decomposition of the hydrogen peroxide releases 2.877 MJ of energy per 1 kg of hydrogen peroxide according to the following reaction: $H_2O_2 \rightarrow H_2O + \frac{1}{2}O_2$. The reaction produces superheated steam and superheated oxygen which expands out of the annulus region 20 of nozzle 14 driving the rocket forward. The rocket engine also includes pumps, conduits, valves, controls, etc., (not shown) which are conventional and well known to those skilled in the art of rocket engines.

FIG. 2 is a cross sectional view of a propellant-fueled rocket in accordance with the present disclosure. The rocket engine 30 is somewhat similar to rocket engine 10 described above, and includes a first storage tank 32 formed of a material such as stainless steel which is resistant to hydrogen peroxide, for storing concentrated hydrogen peroxide, and a second tank 34, for storing a propellant, such as ethanol. As in the case of the FIG. 1 rocket engine embodiment, rocket engine 30 also includes a manifold 35 connecting a catalyst bed 36 comprising a catalytic mesh comprising, e.g., silver or platinum, formed by a 3D additive manufacturing process and treated with acid or another suitable activation treatment as will be described below with tank 32, and a convergent-divergent nozzle 38 having an annulus region 40. Rocket 30 also has a conduit 48 for delivering propellant from tank 34 to injector plates 46 in nozzle 38 region which forms a combustion region 42, as well as pumps, conduits, valves, controls, etc. (not shown) which are well known to those skilled in the art of rocket engines. The decomposition products from catalyst bed 36 are mixed with propellant which is injected into combustion zone in the annulus region 45 via injector plates 46, and the propellant ignited, producing combustion gases which expand out of the annulus region 40, driving the rocket forward.

Referring to FIG. 3, a catalyst bed for use in a rocket accordance with the present disclosure is produced by 3D additive printing techniques employing direct metal laser sintering (DMLS) to print an expanded mesh formed of sterling silver or platinum or other noble metal using a commercially available desk-top metal production printer in a first step 50 until an expanded metal mesh backbone 52 of desired footprint and height is formed. Various DMLS printers are available commercially from a variety of manufacturers, including Desktop Metal, Inc., Velo 3D, Inc. EOS Manufacturing Solutions, Inc., and SLM Solutions Group, AG, which are given as examples. The 3D printed catalyst bed may be formed having any number of layers, each having similar or different surface areas, surface roughness, openings or voids, etc., and/or formed of different materials by bimetallic printing or different materials, e.g., by interspersing printed layers of metallic silver and platinum, and may be formed to exactly fit in the rocket engine, or may be formed to be slightly oversized to reduce or prevent rattling in use. The expanded mesh substrate also may be formed with locking tabs 60 that "pop out" when the catalyst bed is press-fitted into a container as will be described below, to reduce or eliminate rattling in use.

The printed catalyst bed backbone 52 is then passed to a bath in a second step 54 in which the printed catalyst bed backbone 52 is dipped into a treatment bath to condition the silver or platinum surfaces for use as a catalyst for decomposing hydrogen peroxide. The conditioned catalyst bed is then press-fitted into an open ended holding container or can in a pressing step 56, to produce a catalyst bed 58 ready for installation in a rocket engine. In order to avoid or minimize plastic deformation, the conditioned catalyst bed may be heated prior to press-fitting into the holding container or can.

Figure 3A:
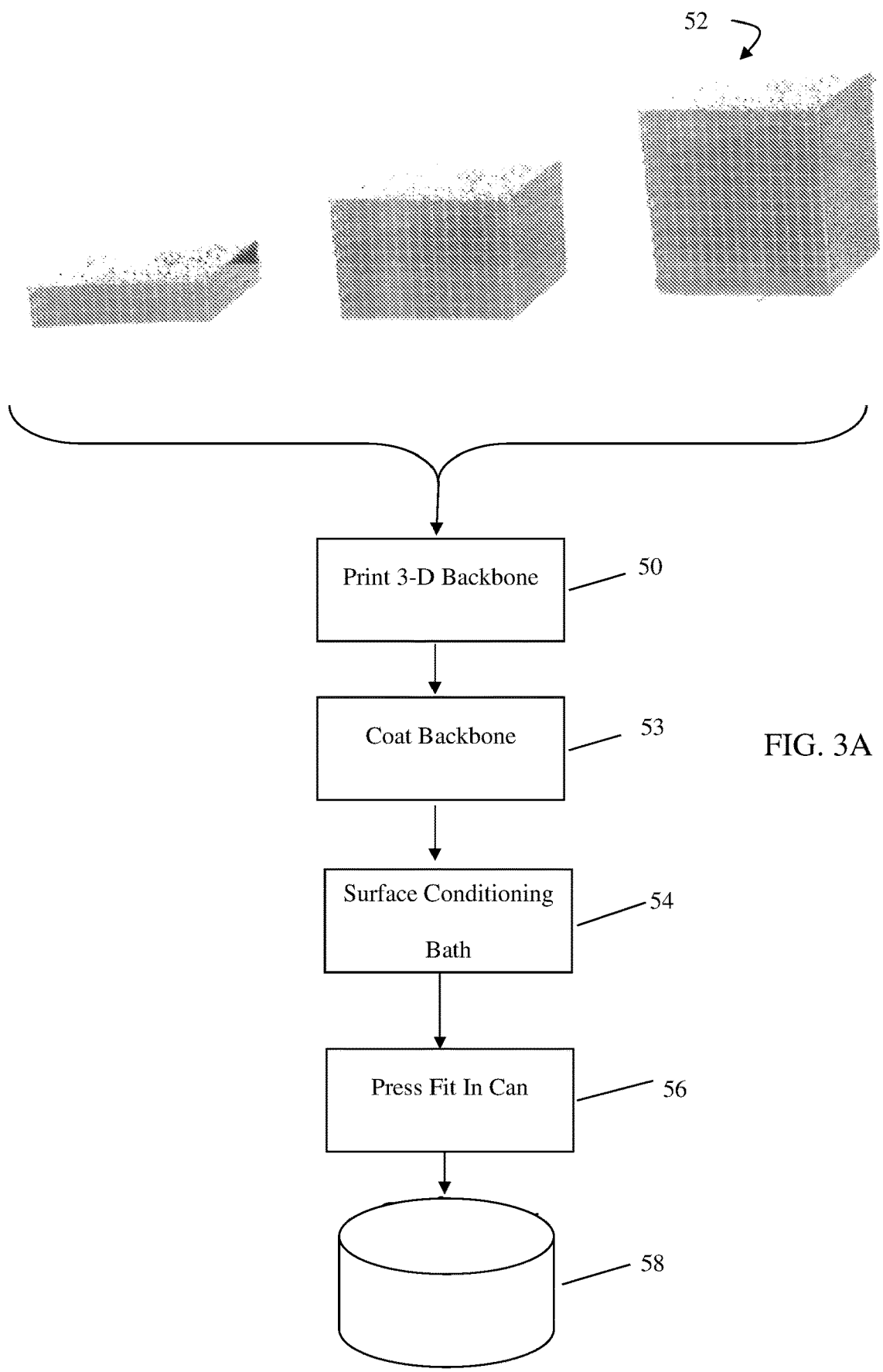

Alternatively, as shown in FIG. 3A, the 3D metal backbone may be formed of a non-precious metal such as nickel or stainless steel, which is then plated with silver or platinum or other noble metal at a coating step 53, before being dipped in the surface conditioning bath 54. Coating may be performed using electroplating or electroless plating, or thermal spraying. In other embodiments, coating may be performed using thermal spraying. The conditioned catalyst is then press-fitted into an open ended holding container or can as above described, for installation in a rocket engine.

3D printing the catalyst bed has many advantages over the prior art techniques which employed forming individual layers and then aligning the individual layers in stacks. They include:

Precise control of the alignment and nesting of the fluid paths (voids) through the bed vs loose control and imprecise alignment with discs formed by layering individual screens;

Variable surface area and improved roughness within the catalyst bed allowing us to design and build-in precise flow restriction vs decomposition profiles;

Non-standard shapes are easily produced;

By making the catalyst bed slightly oversized, or by forming locking edge features that "pop out" into shape when the catalyst bed is pressed into the can or container we are able to eliminate a problem of prior art catalyst beds which after use tend to shrink and become audibly loose inside the catalyst bed container;

We are able to design and build in flow configurations optimal for a particular rocket's design, e.g., radial flow, axial flow, etc.;

We are able to customize geometry, producing catalyst beds with smaller pores at top, to larger at bottom to account for flow resistance, or vice versa, i.e., larger pores at top, to smaller at the bottom;

We are able to tailor catalyst bed geometry, pore sizes, fluid paths, etc. to accommodate modeling reaction kinetics and maintain pressure gradients through the catalyst beds essentially constant to minimize bottlenecks;

We can create "spring" in the catalyst bed, which allows compression after treatment so that the bed fits snuggly in the can or container and doesn't rattle, after use;

We can make some members of the catalyst bed elements thinner and some thicker to control compression;

We can form the catalyst beds with a chain link shape.

A feature of the present disclosure is that the additive 3D manufacturing techniques permit forming catalyst beds in essentially any geometric shape. Also, the use of 3D additive printing techniques permits us to create coolant flow channels through the catalyst bed.

Another feature of the present disclosure is that we can create channels through the catalyst bed for conduits for the rocket fuel so that the rocket fuel can be pre-heated before being delivered to the combustion zone in the annulus region of the rocket.

Various changes and advantages may be made in the above disclosure without departing from the spirit and scope thereof. For example, referring again to FIG. 2, a portion of the hydrogen peroxide may be vaporized while flowing through bypass orifices adjacent to the catalytic orifices and then injected directly into the combustion region 42 via conduit 70, where it the hydroxide ions are combusted. See, also FIGS. 4A-4D which depict other 3D catalyst bed shapes. In some embodiments, where supercritical water is also injected into the combustion chamber, this becomes a "quad propellant" rocket engine (e.g., ammonia, oxygen, vaporized peroxide, and supercritical water).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

What is claimed:

1. A method for forming a catalyst bed for catalytic decomposition of hydrogen peroxide, wherein the catalyst bed is configured to fit into a holding container, comprising the steps of:
   (1) forming a backbone using 3D printing techniques; and
   (2) treating the surface of the backbone from step (1) to activate the backbone surface, wherein the backbone surface comprises one or more of a noble metal and a manganese compound complex, wherein the catalyst bed is formed with locking edge features configured to pop out into shape when the catalyst bed is pressed into the holding container or can.

2. The method of claim 1, wherein the noble metal is selected from the group consisting of ruthenium, rhodium, palladium, silver, osmium, iridium, platinum and gold, a mixture thereof, and an alloy thereof.

3. The method of claim 2, wherein the noble metal comprises silver or platinum or layers of silver and platinum metal.

4. The method of claim 1, wherein the backbone is formed of a metal substrate coated with a noble metal.

5. The method of claim 4, wherein the metal substrate comprises nickel or stainless steel.

6. The method of claim 4, wherein the noble metal is selected from the group consisting of ruthenium, rhodium, palladium, silver, osmium, iridium, platinum and gold, a mixture thereof, and an alloy thereof.

7. The method of claim 4, wherein the coating of the noble metal on the metal substrate is accomplished by one or more of electroplating, electroless plating, and thermal spraying.

8. A catalyst bed for catalytic decomposition of hydrogen peroxide formed by the method of claim 1.

9. The catalyst bed of claim 8, wherein the backbone comprises silver or platinum metal or layers of silver and pure platinum metal.

10. The catalyst bed of claim 8, wherein the backbone comprises a metal substrate plated with silver or platinum.

11. The catalyst bed of claim 10, wherein the metal substrate comprises nickel or stainless steel.

12. The catalyst bed of claim 10, wherein the silver or platinum is coated on the metal substrate by one or more electroplating, electroless plating, and thermal spraying.

13. A rocket comprising a fuel store, an oxidizer store, and a rocket engine, wherein the oxidizer comprises a stabilized solution of hydrogen peroxide, and a 3D printed catalyst bed as claimed in claim 8.

14. A rocket engine comprising a monopropellant store and a 3D printed catalyst bed as claimed in claim 8.

15. The rocket engine as claimed in claim 13, wherein the rocket comprises a propellant-fueled rocket.

16. The rocket of claim 13, wherein the backbone comprises silver or platinum metal or layers of silver and platinum metal.

17. The rocket of claim 13, wherein the backbone comprises a metal substrate plated with silver or platinum.

18. The rocket of claim 17, wherein the metal substrate comprises nickel or stainless steel.

19. The rocket of claim 17, wherein the metal substrate is coated by one or more of electroplating, electroless plating, and thermal spraying.

\* \* \* \* \*